US006957842B1

(12) United States Patent
Garska (10) Patent No.: US 6,957,842 B1
(45) Date of Patent: Oct. 25, 2005

(54) CONVERTIBLE ROOF BOW TENSIONING APPARATUS (75) Inventor: Bradley R. Garska, Saline, MI (US)

(73) Assignee: ASC Incorporated, Southgate, MI (US)

( * ) Notice: Subject to any disclaimer, the term of this patent is extended or adjusted under 35 U.S.C. 154(b) by 1 day.

(21) Appl. No.: 10/836,313

(22) Filed: Apr. 30, 2004

(51) Int. Cl.[7] .............................................. B60J 10/10
(52) U.S. Cl. ........................ 296/107.12; 296/107.08; 296/116; 296/121
(58) Field of Search .................... 296/107.12, 118, 296/116, 107.09, 108, 107.07, 107.08, 121, 296/117, 107.01

(56) References Cited

U.S. PATENT DOCUMENTS

| 1,294,148 | A |   | 2/1919  | Oliver              |
|-----------|---|---|---------|---------------------|
| 1,426,129 | A |   | 8/1922  | Velo                |
| 2,230,140 | A |   | 1/1941  | Falcon              |
| 2,267,471 | A |   | 12/1941 | Keller              |
| 2,297,820 | A |   | 10/1942 | Westrope            |
| 2,322,839 | A |   | 6/1943  | Falcon              |
| 2,329,802 | A |   | 9/1943  | Westrope            |
| 2,368,133 | A |   | 1/1945  | Galamb              |
| 2,372,583 | A |   | 3/1945  | Keller              |
| 2,376,949 | A |   | 5/1945  | Westrope            |
| 2,459,089 | A |   | 1/1949  | Orr                 |
| 2,540,454 | A |   | 2/1951  | Milhan              |
| 2,580,486 | A |   | 1/1952  | Vigmostad           |
| 2,768,857 | A |   | 10/1956 | Albrecht            |
| 2,770,489 | A |   | 11/1956 | Garvey et al.       |
| 2,794,672 | A |   | 6/1957  | Burzi               |
| 2,895,764 | A |   | 7/1959  | Himka et al.        |
| 3,002,785 | A |   | 10/1961 | Larche              |
| 3,030,140 | A |   | 4/1962  | Probst              |
| 3,159,422 | A |   | 12/1964 | Lautenbach          |
| 3,297,357 | A | * | 1/1967  | Adamski .... 296/117 |
| 3,473,842 | A |   | 10/1969 | Bracey et al.       |
| 3,536,354 | A |   | 10/1970 | Ingram              |
| 3,608,956 | A | * | 9/1971  | Adamski .... 296/117 |
| 3,994,524 | A |   | 11/1976 | Lehmann             |
| 4,487,447 | A |   | 12/1984 | Schroder            |
| 4,537,440 | A |   | 8/1985  | Brockway et al.     |
| 4,573,732 | A |   | 3/1986  | Muscat              |
| 4,711,485 | A |   | 12/1987 | Maebayashi et al.   |
| 4,720,133 | A | * | 1/1988  | Alexander et al. .... 296/116 |
| 4,741,571 | A |   | 5/1988  | Godette             |
| 4,778,215 | A |   | 10/1988 | Ramaciotti          |
| 4,784,428 | A |   | 11/1988 | Moy et al.          |
| 4,828,317 | A |   | 5/1989  | Muscat              |
| 4,838,601 | A |   | 6/1989  | Kolb                |

(Continued)

FOREIGN PATENT DOCUMENTS

AU    NR. 364774    11/1981

(Continued)

OTHER PUBLICATIONS

Drawings of Toyota Celica Outfolding Top Stack Mechanism, 4 pages (offered for sale in U.S. prior to 2004).

(Continued)

Primary Examiner—Kiran B. Patel
(74) Attorney, Agent, or Firm—Harness, Dickey & Pierce, P.L.C.

(57) ABSTRACT

The preferred embodiment of a convertible roof bow tensioning apparatus includes a pliable roof cover, a top stack mechanism supporting the roof cover having at least one roof bow, and a roof bow tensioner for selectively reducing and increasing tension of the roof cover. Another aspect of the present invention provides a camming apparatus operably extending and retracting a roof bow relative to a remainder of a convertible top stack mechanism.

20 Claims, 10 Drawing Sheets

U.S. PATENT DOCUMENTS

| | | |
|---|---|---|
| 4,840,419 A | 6/1989 | Kolb |
| 4,850,634 A | 7/1989 | Taubitz |
| 4,929,015 A | 5/1990 | Bauer |
| 4,936,626 A | 6/1990 | Gmeiner et al. |
| 4,948,194 A | 8/1990 | Dogliani |
| 4,958,882 A | 9/1990 | Kolb |
| 4,984,841 A | 1/1991 | Bauer et al. |
| 5,004,291 A | 4/1991 | Bauer et al. |
| 5,026,110 A | 6/1991 | Koop et al. |
| 5,033,789 A | 7/1991 | Hayashi et al. |
| 5,052,740 A | 10/1991 | Bauer et al. |
| 5,067,768 A | 11/1991 | Fischbach |
| RE34,033 E | 8/1992 | Godette |
| 5,161,852 A | 11/1992 | Alexander et al. |
| 5,225,747 A | 7/1993 | Helms et al. |
| 5,251,952 A | 10/1993 | Guckel et al. |
| 5,301,987 A | 4/1994 | Tokarz et al. |
| 5,338,085 A | 8/1994 | Guckel et al. |
| 5,385,381 A | 1/1995 | Moore et al. |
| 5,429,409 A | 7/1995 | Corder et al. |
| 5,445,429 A | 8/1995 | Koehler et al. |
| 5,620,226 A | 4/1997 | Sautter, Jr. |
| 5,624,149 A | 4/1997 | Tokarz |
| 5,667,269 A | 9/1997 | Prenger et al. |
| 5,678,881 A | 10/1997 | Tokarz |
| 5,765,904 A | 6/1998 | Aydt et al. |
| 5,769,483 A | 6/1998 | Danzl et al. |
| 5,779,299 A | 7/1998 | Purcell et al. |
| 5,903,119 A * | 5/1999 | Laurain et al. ......... 296/107.09 |
| 5,944,375 A | 8/1999 | Schenk et al. |
| 5,998,948 A * | 12/1999 | Lange et al. ................ 296/122 |
| 6,033,008 A | 3/2000 | Mattila |
| 6,042,174 A * | 3/2000 | Durrani ................. 296/107.12 |
| 6,155,614 A | 12/2000 | Lange |
| 6,237,986 B1 | 5/2001 | Neubrand et al. |
| 6,322,137 B1 * | 11/2001 | Munsters ............... 296/107.12 |
| 6,328,372 B1 | 12/2001 | Just |
| 6,390,531 B1 | 5/2002 | Schutt |
| 6,398,296 B1 | 6/2002 | Mayer |
| 6,412,860 B1 | 7/2002 | Reinsch |
| 6,416,111 B1 | 7/2002 | Neubrand |
| 6,416,121 B1 | 7/2002 | Miklosi |
| 6,428,090 B1 | 8/2002 | Reinsch |
| 6,450,562 B1 | 9/2002 | Miklosi et al. |
| 6,464,284 B2 | 10/2002 | Neubrand |
| 6,550,842 B1 | 4/2003 | Halbweiss et al. |
| 6,623,065 B2 | 9/2003 | Halbweiss et al. |
| 6,666,494 B2 | 12/2003 | Antreich |
| 6,695,385 B1 * | 2/2004 | Lange ................... 296/107.12 |
| 6,871,899 B2 * | 3/2005 | Mandl et al. .......... 296/107.12 |
| 2002/0014783 A1 | 2/2002 | Nicastri |
| 2003/0057728 A1 * | 3/2003 | Sims ..................... 296/107.08 |
| 2003/0127883 A1 | 7/2003 | Antreich |
| 2003/0146642 A1 * | 8/2003 | Mandl et al. .......... 296/107.12 |
| 2004/0032146 A1 | 2/2004 | Plesternings |
| 2004/0094988 A1 | 5/2004 | Doncov et al. |
| 2004/0189041 A1 * | 9/2004 | Lange ........................ 296/121 |
| 2004/0262942 A1 * | 12/2004 | Willard ................. 296/107.12 |

FOREIGN PATENT DOCUMENTS

| | | |
|---|---|---|
| CA | 530770 | 9/1956 |
| DE | 3724531 C1 | 12/1988 |
| DE | 3837522 A1 | 5/1990 |
| DE | 3937764 C1 | 12/1990 |
| DE | 4129493 C1 | 8/1992 |
| EP | 0 351 378 | 1/1990 |
| EP | 0 857 597 | 8/1998 |
| EP | 0 885 760 B1 | 2/2003 |
| FR | 2 661 140 | 10/1991 |
| GB | 836677 | 6/1960 |
| GB | 995393 | 6/1965 |
| GB | 1 223 070 | 2/1971 |
| WO | WO 02/064391 | 8/2002 |

OTHER PUBLICATIONS

Photographs of A-joint in Outfolding Top Stack Mechanism, 2 pages (offered for sale in U.S. prior to 2004).

Description and Exhibit A, drawing of No. 4 bow of 1997 Bentley Azure (offered for sale prior to Aug. 22, 1997) 1 page.

Exhibit B, 1996 Rolls Royce Corniche convertible top, portion of Rolls Royce Parts, Service and Maintenace CD-ROM (offered for sale prior to Aug. 22, 1997) 3 pages.

* cited by examiner

CONVERTIBLE ROOF BOW TENSIONING APPARATUS

BACKGROUND AND SUMMARY OF THE INVENTION

This invention relates generally to automotive vehicle convertible roofs and more particularly to a convertible roof bow tensioning apparatus.

Traditional soft-top convertible roofs for automotive vehicles typically employ four or five roof bows spanning transversely across the vehicle for supporting a vinyl, canvas or polyester fiber, pliable roof cover. The roof bows extend between foldable side rails which can be automatically or manually raised and lowered. Many conventional soft-top convertible roofs inherently drift due to the stretched fabric cover pulling the forwardmost number one roof bow in an unintended and undesired rearward direction away from the front header when the roof is raised. This drifting situation is especially apparent in new convertible roofs or in cold weather. Accordingly, the vehicle occupant must then physically pull down upon a handle attached to the number one roof bow and hold it against the front header panel for subsequent manual latching, or an automated latch is employed with a difficult to package, extended reach. This drifting problem is also present between a rearmost or number five roof bow and an adjacent tonneau cover, when a hard-tonneau cover is employed to cover the convertible roof boot well. The stretched fabric cover tends to pull the number five roof bow in a forward manner thereby causing it to drift away from the mating tonneau cover. This five bow drift situation is inconvenient to remedy due to the difficulty of an occupant accessing this rear area when seated in the front seat.

Notwithstanding, the following U.S. patents disclose various systems which attempt to minimize the drift concern: U.S. Pat. No. 5,998,948 entitled "Convertible Roof Actuation Mechanism" which issued to Lange et al. on Dec. 7, 1999; U.S. Pat. No. 5,903,119 entitled "Convertible Roof Actuation Mechanism" which issued to Laurain et al. on May 11, 1999; and U.S. Pat. No. 5,385,381 entitled "Vehicle Roofs" which issued to Moore et al. on Jan. 31, 1995; these patents are incorporated by reference herein. While the Lange et al. and Laurain et al. patents are significant improvements in the field, further refinement of a convertible roof bow tensioning configuration is desirable in order to reduce packaging size and cost while improving performance and locational placement.

In accordance with the present invention, the preferred embodiment of a convertible roof bow tensioning apparatus includes a pliable roof cover, a top stack mechanism supporting the roof cover having at least one roof bow, and a roof bow tensioner for selectively reducing and increasing tension of the roof cover. Another aspect of the present invention provides a camming apparatus operably extending and retracting a roof bow relative to a remainder of a convertible top stack mechanism. In a further aspect of the present invention, a tensioning number two bow, three bow, four bow and/or five bow are provided. Still another aspect of the present invention employs a linearly moving apparatus operable to make a convertible roof cover taut and slack in order to reduce convertible roof drift.

The convertible roof bow tensioning apparatus of the present invention is advantageous over conventional constructions in that the present invention reduces drift of the raised convertible roof away from the front header panel and, alternately a tonneau cover, by selectively reducing and then increasing tension or tautness of the roof cover. Furthermore, packaging space of the stowed convertible roof is optimized in the storage compartment by selected reduction in height of a roof bow. Another advantage of the present invention is employment of the tensioner in tight packaging spaces for use with a number two bow or a number three bow, although it may also provide movement to a number four or five roof bow. Moreover, the present invention advantageously provides relatively simple mechanisms and movement directions (such as linear movement) thereby advantageously being easier to design, package and refine during assembly or for service. Additional advantages and features of the present invention will become apparent from the following description and appended claims, taken in conjunction with the accompanying drawings.

DETAILED DESCRIPTION OF THE PREFERRED EMBODIMENTS

Figures 1, 2:
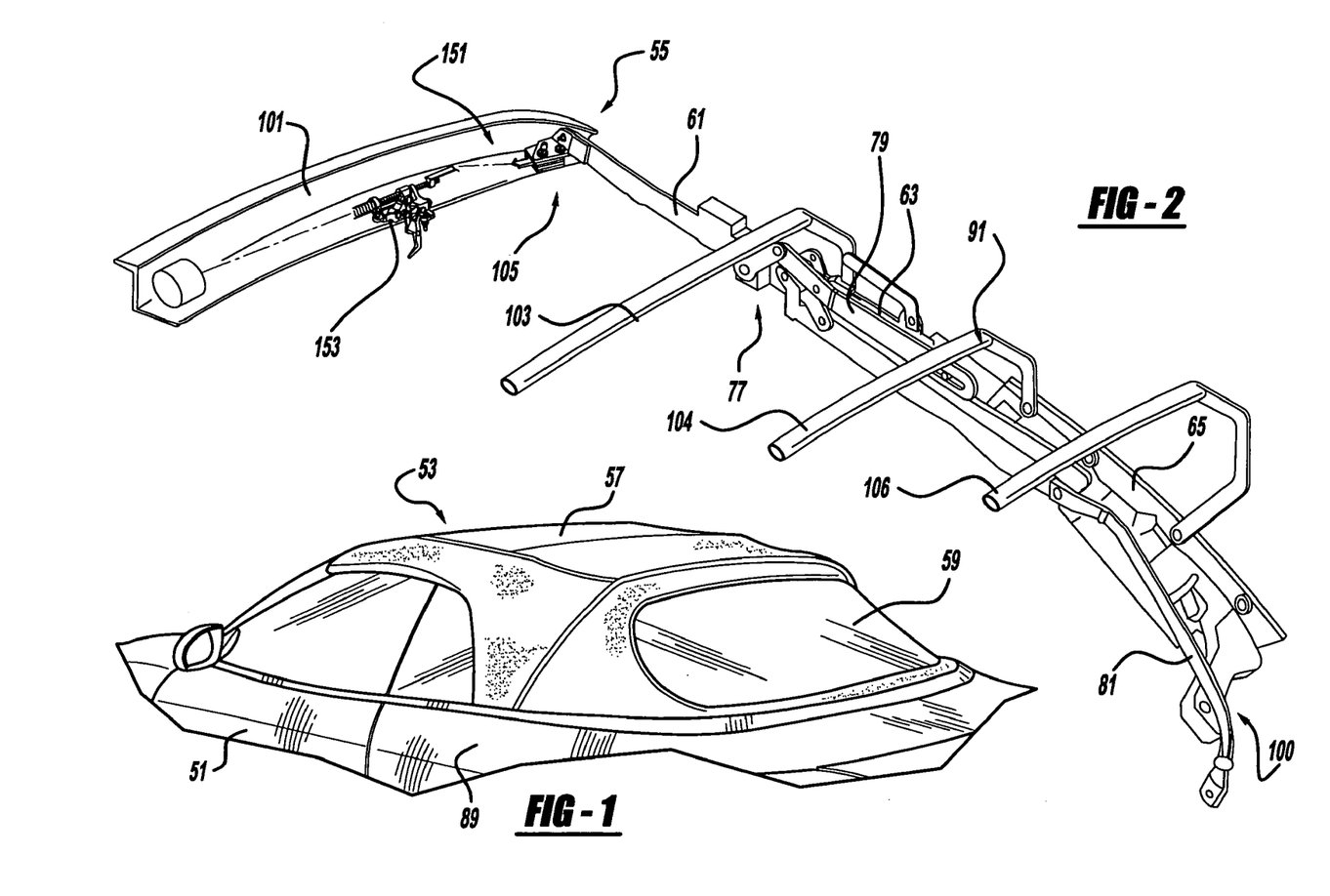
FIGS. 1 and 2 are fragmentary perspective views showing a first preferred embodiment of a convertible roof apparatus of the present invention.
Figure 3:
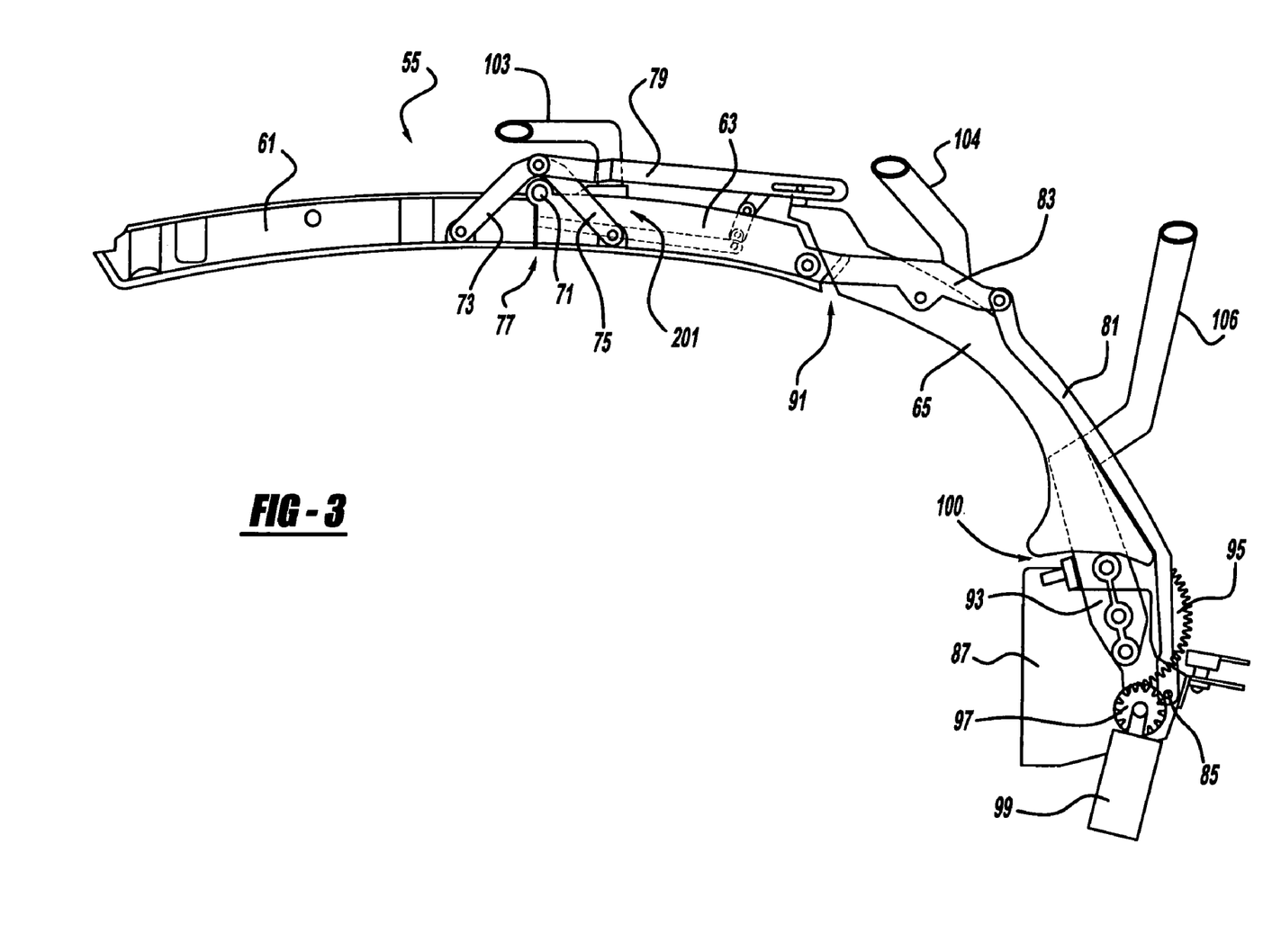
FIGS. 3 and 4 are side diagrammatic views showing the first preferred embodiment convertible roof apparatus in fully raised and partially retracted positions, respectively.
Figure 4:
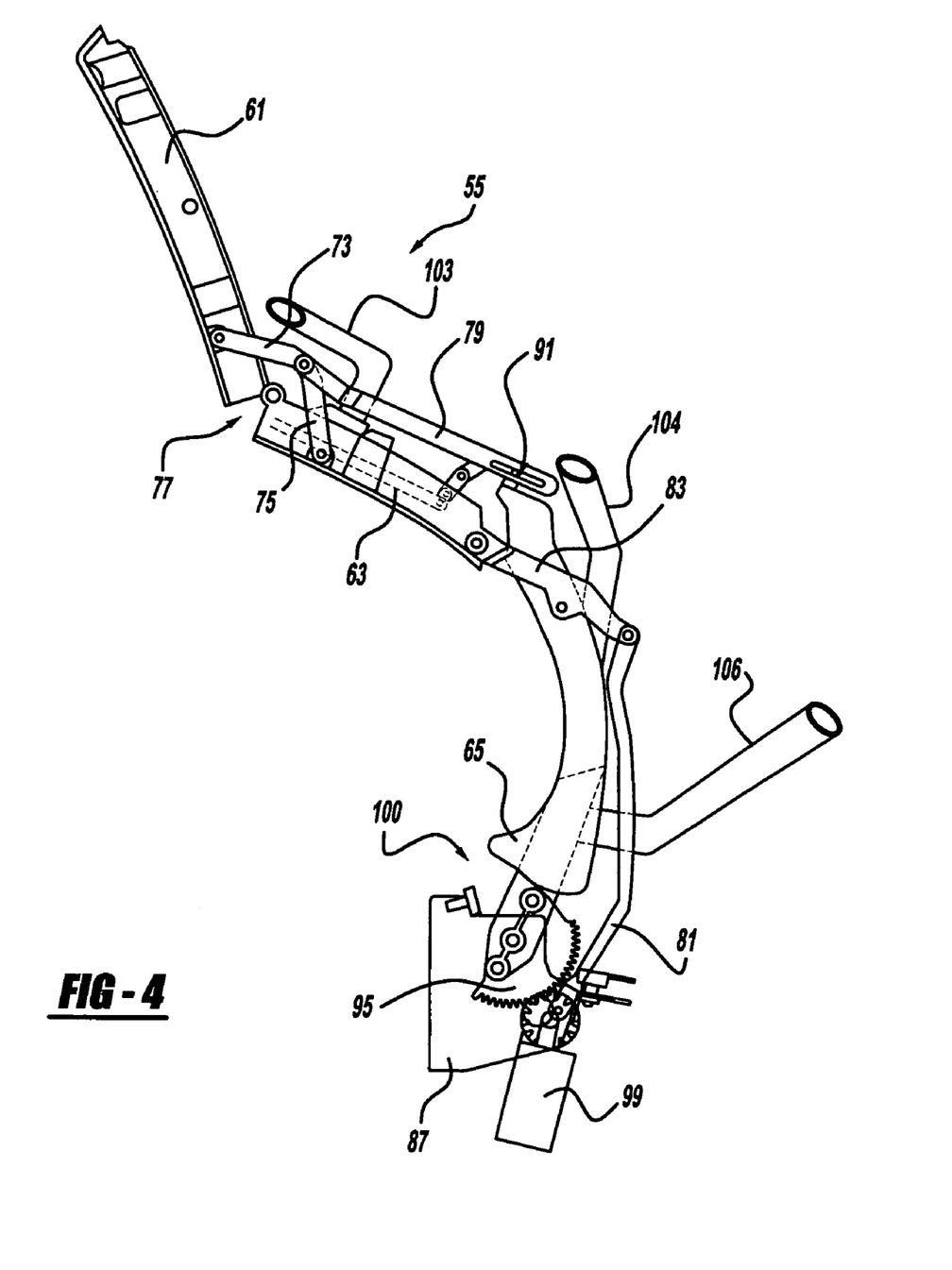

An automotive vehicle 51 having a convertible roof system of the present invention is shown in FIGS. 1–3. The convertible roof system employs a convertible roof 53 defined by a foldable top stack mechanism 55 which is externally covered by a pliable or flexible, soft-top cover 57, and a glass or PVC backlite or back window 59. Top stack mechanism 55 will be described hereinafter with regard to the right-hand side of the automotive vehicle as the majority of components are in mirrored symmetry on the left-hand side. Top stack mechanism 55 includes a front side roof rail 61, a center side roof rail 63 and a rear side roof rail 65. Side rails 61, 63 and 65 are all structural members which are elongated in a primarily fore-and-aft direction when in the fully raised position shown in FIGS. 1, 2, 3 and 5. FIG. 4 illustrates top stack mechanism 55 in a partially raised/partially retracted position.

A pivotal hinge 71 and a pair of pivotally coupled, diagonal links 73 and 75 define a four-bar B-pivot joint 77 between front side rail 61 and center side rail 63. A control link 79 has a first end pivotally coupled at the intersection of diagonal links 73 and 75 and has an opposite end pivotally connected to an upper and forward corner of rear side rail 65. An elongated balance link 81 has a first end pivotally coupled to a rearwardly projecting arm 83 extending from center side rail 63. An opposite end of balance link 81 has a pivot 85 pivotally coupled to a stationary bracket 87 affixed to an inner quarter panel of the vehicle body 89 or the like. Thus, the intersections between control link 79 to rear side rail 65 and arm 83 of center side rail 63 to balance link 81 define a C-pivot joint 91 between center side rail 63 and rear side rail 65. A reinforcement 93 has an upper end securely affixed to a lower section of rear side rail 65. An opposite end of reinforcement 93 is securely mounted to a sector gear 95, which in turn, is enmeshed with an output gear 97 automatically driven by an electric motor actuator 99. Alternately, top stack mechanism 55 can be automatically driven by a hydraulic actuator or even manually driven by the vehicle user without an actuator. A D-pivot joint 100 is defined at the lower interface between rear side rail 65 and bracket 87 rotatably coupled thereto.

A forwardmost and number one roof bow 101 extends in a primarily cross-vehicle direction. Similarly, a number two roof bow 103 extends between the right-hand and left-hand side rail assemblies adjacent B-joint 77. Additionally number two 103, number three 104 and number four 106 cross-vehicle roof bows 104 and extend between the roof rail assemblies, and an optional number five roof bow (see FIG. 9) may be provided along the rearmost edge of the convertible roof in an alternate embodiment. All of the roof bows are elongated structural members which support and are attached to pliable cover 57. An A-joint 105 is provided at a pivotal intersection between number one roof bow 101 and front side rail 61 for an outfolding convertible roof. Furthermore, an electric motor actuated, front header latch 153 is mounted to number one bow 101 wherein a latching hook is engagable with a striker mounted to a front header, body panel of the vehicle prior to full tensioning of cover 57.

Figure 5:
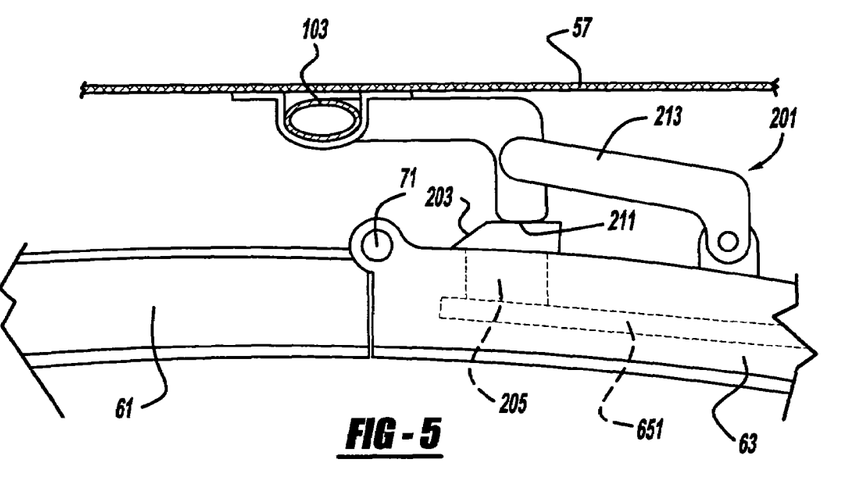
FIGS. 5 and 6 are side diagrammatic views showing the first preferred embodiment convertible roof apparatus in advanced-taut and retracted-slack conditions, respectively.
Figure 6:
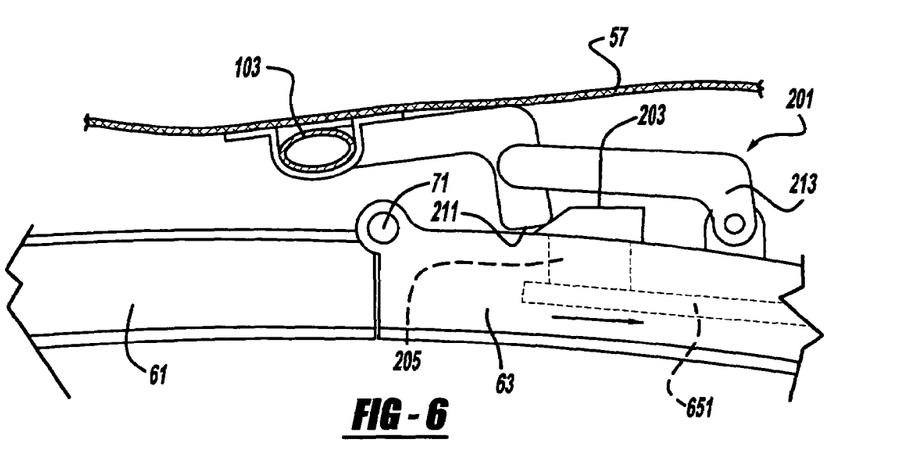
Figure 7:
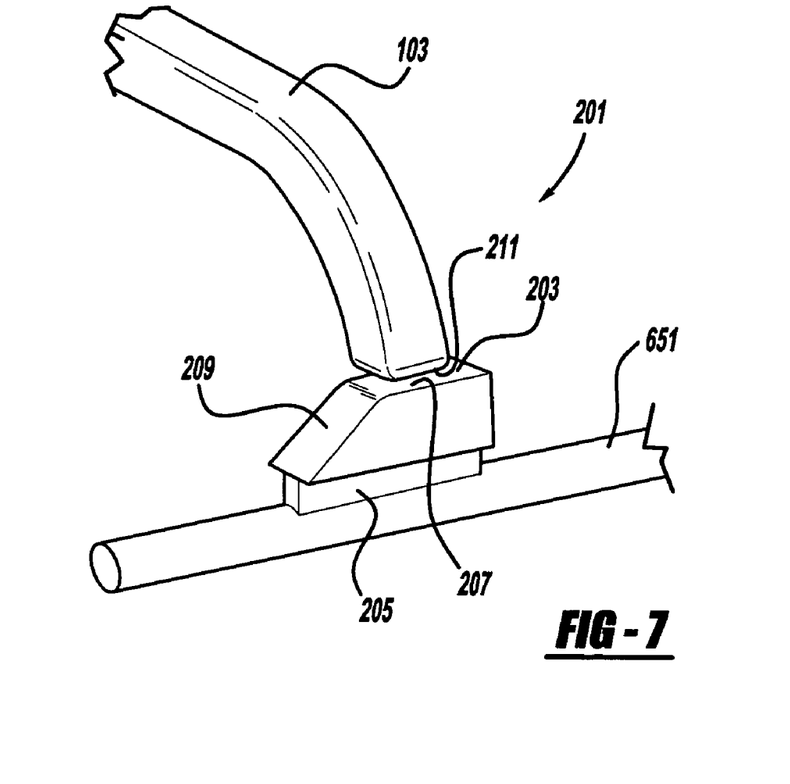
FIGS. 7 and 8 are perspective, diagrammatic views showing the first preferred embodiment convertible roof apparatus in advanced-taut and retracted-slack conditions, respectively.
Figure 8:
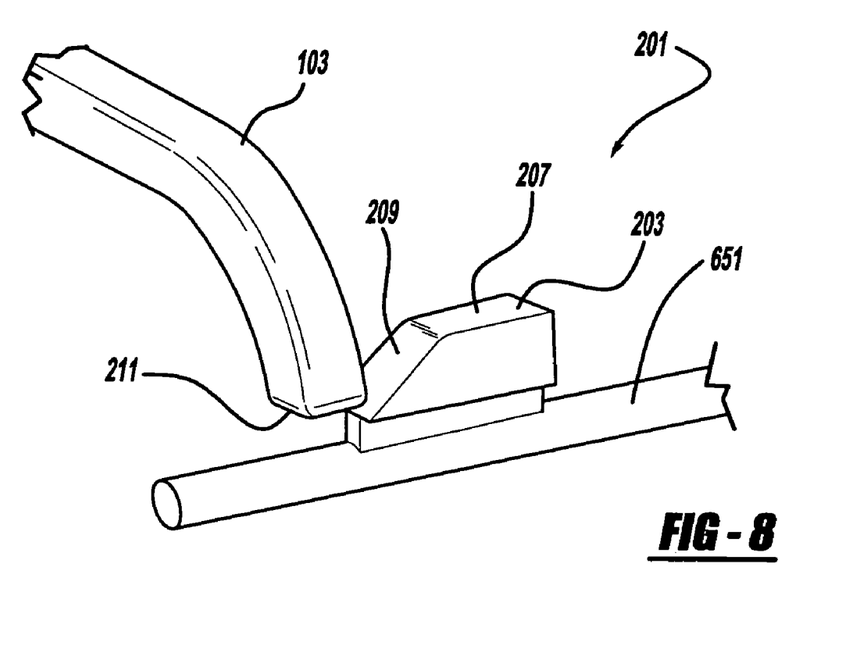
Figure 9:
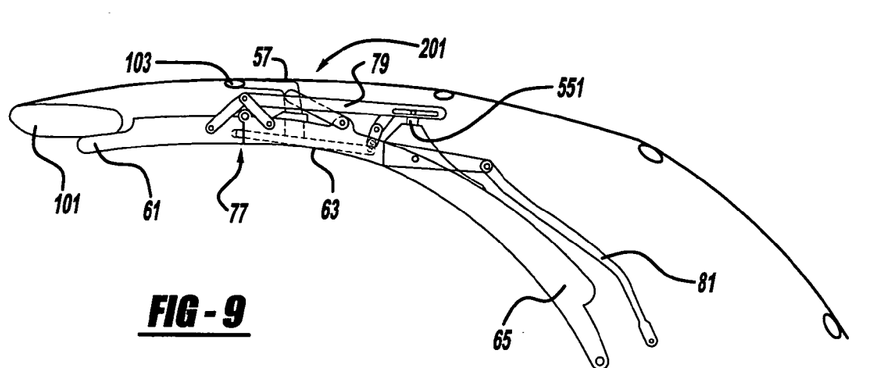
FIG. 9 is a diagrammatic side view showing the first preferred embodiment convertible roof apparatus of the present invention in a raised position.
Figures 10, 11:
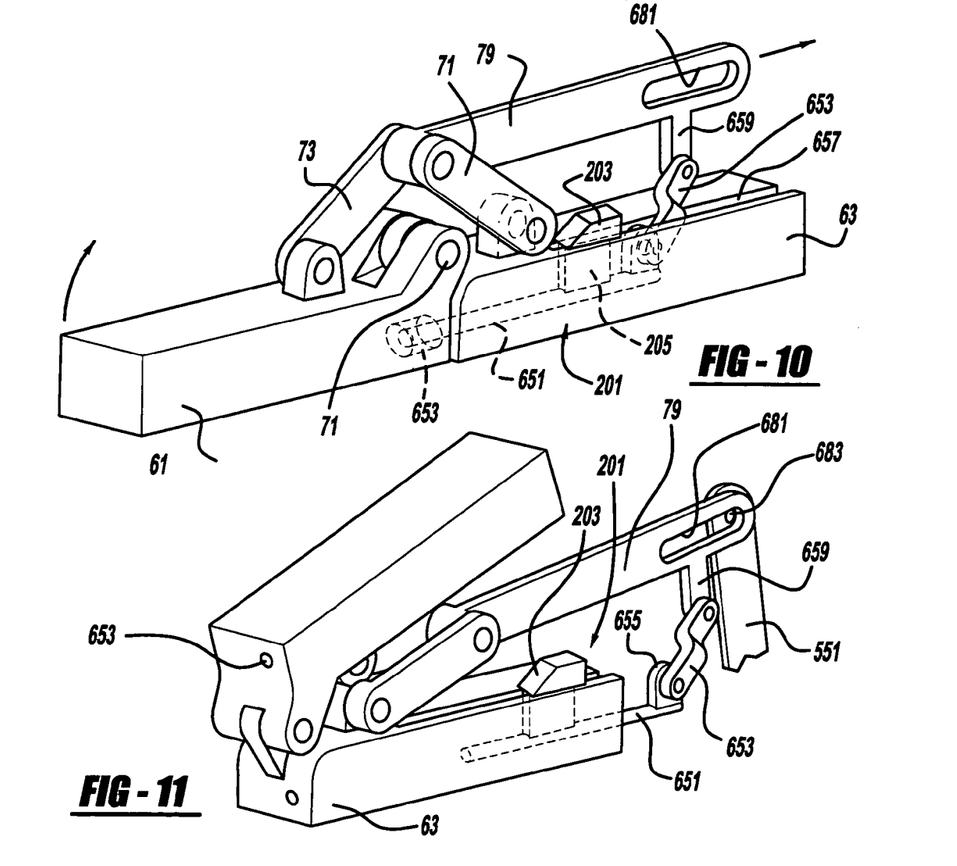
FIGS. 10 and 11 are perspective views showing the first preferred embodiment convertible roof apparatus in fully raised and fully retracted positions, respectively.

Referring now to FIGS. 9–11, a first preferred embodiment of the present invention apparatus provides a passively driven roof bow tensioner 201. A linearly sliding rod or bar 651 is movable in a passageway within center side rail 63. In a B-joint locking, optional variation useful with an outfolding roof, bar 691 is moved into engagement with a receptacle 653 located in front side rail 61, as shown in FIG. 10, when the convertible roof is in its raised position, or disengaged therefrom when in its lowered position, as shown in FIG. 11. The variation without joint locking is shown in FIGS. 5 and 6. A push link 653 has one end connected to an upstanding tab 655 affixed to bar 651 which is linearly slidable within a center side rail slot 657. An opposite end of push link 653 is rotatably coupled to a downwardly extending flange 659 attached to control link 79. A lost motion connection is provided between an elongated slot 681 internal to control link 79 and an interfacing follower pin 683 attached to an end of drive link 551. Drive link 551 has its opposite end affixed to rear side rail 65 through an extension or bracket. Thus, bar 651 is selectively moved an initial amount prior to or after significant movement of the corresponding joint between the side rails and remaining top stack mechanism.

Tensioner 201 further includes a camming block, having an exterior camming surface 203, which is affixed to bar 651 by a flange 205. Camming surface 203 includes an upper flat surface 207 and a leading, acutely angled ramp surface 209, as can best be observed in FIGS. 5–8. Thus, camming surface 203 linearly advances and retracts with bar 651.

A lower edge 211 of number two roof bow 103 acts as a cam follower when it rides along camming surface 203 thereby selectively raising and lowering number two roof bow 103 in the process which tensions and removes tension from (add slack to) roof cover 57, respectively. A connecting link 213, which can have a variety of shapes and attachment points depending on the vehicle, pivotally couples number two roof bow 103 to center side rail 63, while still allowing roof bow movement. Thus, linear bar action causes generally vertical movement of the number two roof bow separately from the remainder of the top stack mechanism movement.

Figure 12:
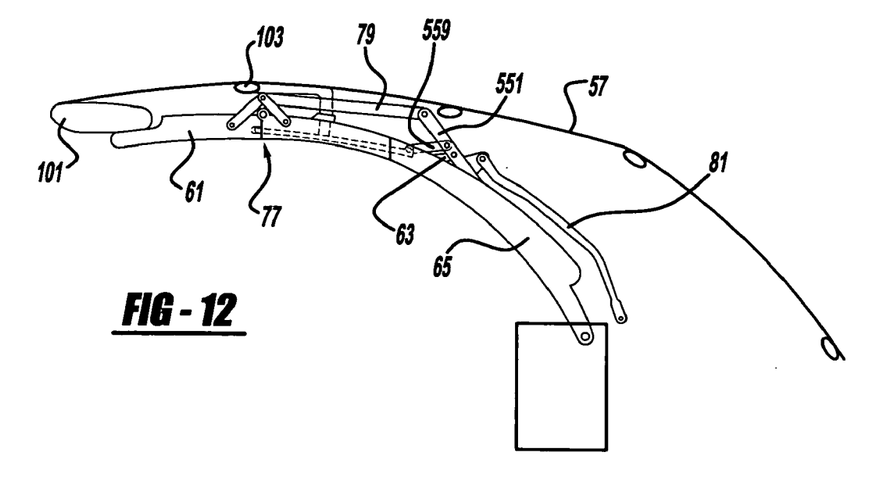
FIG. 12 is a diagrammatic side view showing a second preferred embodiment convertible roof apparatus in a fully raised position.
Figure 13:
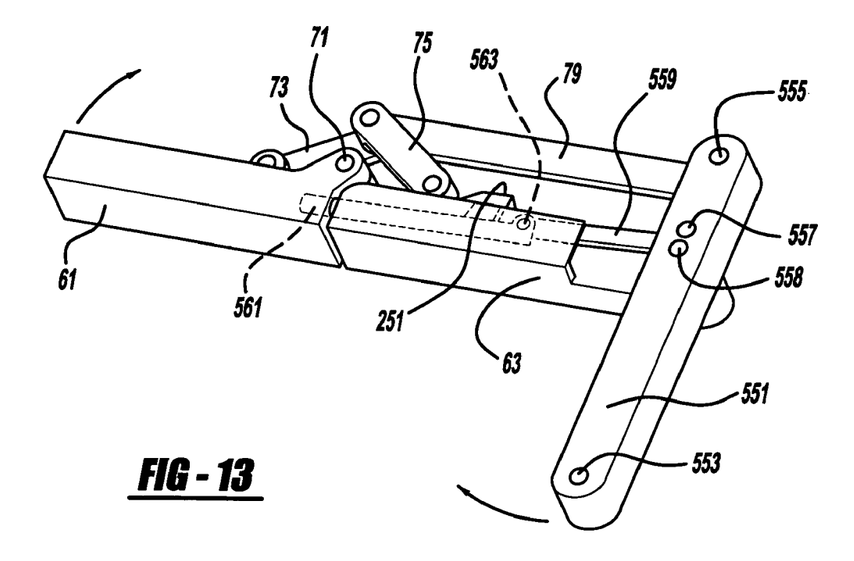
FIGS. 13 and 14 are perspective views showing the second preferred embodiment convertible roof apparatus in fully raised and partially retracted positions, respectively.
Figure 14:
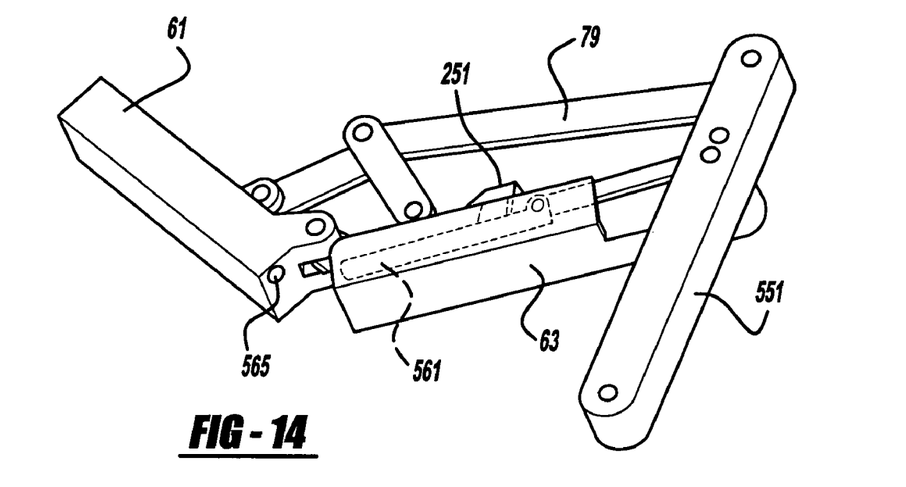

Reference should now be made to FIGS. 12–14. A second preferred embodiment system employs a passively driven tensioning configuration with a driving link 551 having a first pivot 553 pivotally coupled to and driven by rear side rail 65. An opposite pivot 555 of driving link 551 is coupled to and drives control link 79, which in turn, causes rotation of front side rail 61 relative to center side rail 63. A central pivot 557 of drive link 551 is coupled to a push rod 559 at one end while an opposite end is coupled to an elongated rod or bar 561 at pivot 563. A fulcrum-like pivot 558 rotatably couples driving link 551 to an arm rearwardly projecting from center side rail 63. Accordingly, normal movement of the top stack mechanism and convertible roof from the partially raised position shown in FIG. 14, to the fully raised, shown in FIGS. 12 and 13, causes bar 561 to be linearly extended in a generally fore-and-aft direction for optional snug engagement within a joint-locking receptacle 565 in front side rail 61 while moving a camming surface 251 attached to bar 561. Camming surface 251 movement tensions and adds slack to cover 57 due to movement of number two bow 103 as with the prior embodiment. A lost motion coupling, such as the slotted one previously disclosed, may be needed depending upon geometric motions and movement timing required of the top stack mechanism on a vehicle-to-vehicle basis.

Figure 15:
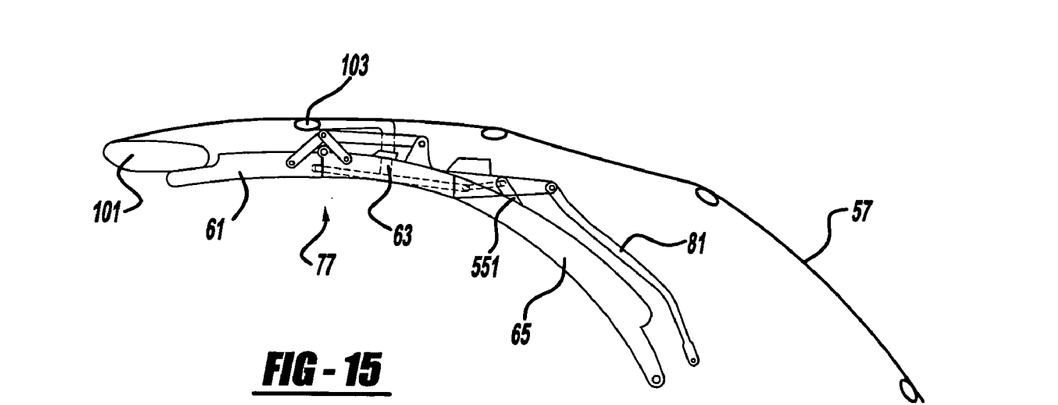
FIG. 15 is a diagrammatic side view showing a third preferred embodiment convertible roof apparatus in a fully raised position.
Figure 16:
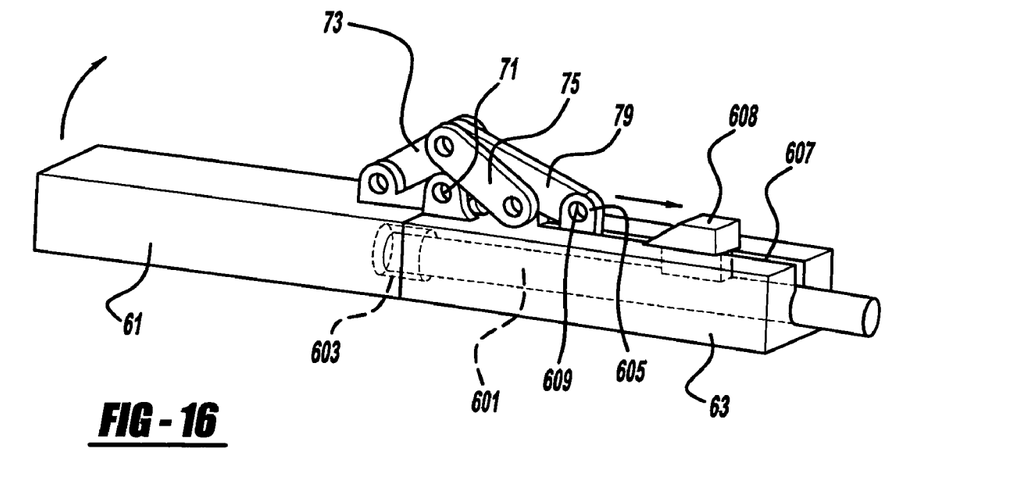
FIGS. 16 and 17 are perspective views showing the third preferred embodiment convertible roof apparatus in fully raised and partially retracted positions, respectively.
Figure 17:
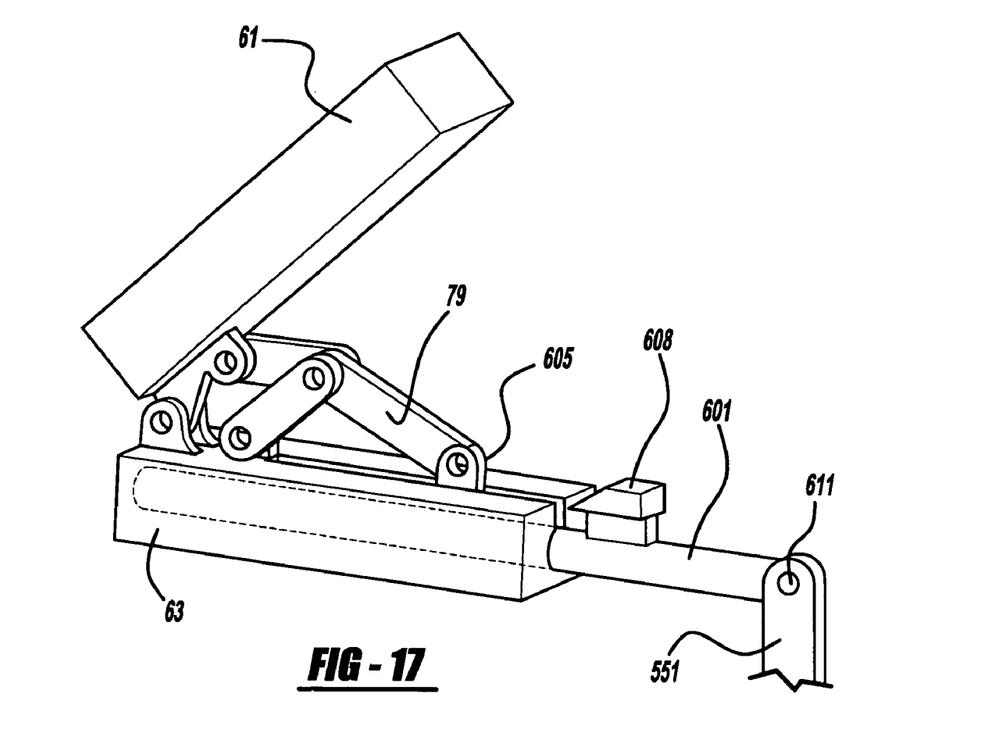

Furthermore, FIGS. 15–17 disclose a third preferred embodiment system of the present invention employing another passive tensioning configuration. In this construction, a linearly moving rod or bar 601 slides in a generally fore-and-aft direction within a passageway internal to center side rail 63. As a joint-locking option, a distal end of bar 601 is received within a mating receptacle 603 disposed in front side rail 61, when in its locking condition with the convertible roof fully raised. Bar 601 is pivotally coupled to and driven by drive arm 551, and possibly an intermediate push rod if needed, which is affixed to rear side rail 65 for concurrent movement therewith. An upstanding tab 605 projects from the middle portion of bar 601 and freely slides within an elongated slot 607 in center side rail 63. Tab 605 concurrently moves with bar 601 and operably drives control link 79 in order to operate B-joint 77 when bar 601 is withdrawn. A camming surface 608 of a camming block is affixed to and moves with bar 601 in order to raise and lower a cam follower end of number two roof bow 103. A lost motion pivot and slot coupling may be required at a connection 609 between tab 605 and control link 79, at a connection 611 between bar 601 and arm 551, and/or at another suitable location in order to allow some initial joint unlocking and/or untensioning movement before the B-joint is rotated or header latch is activated.

Figure 18:
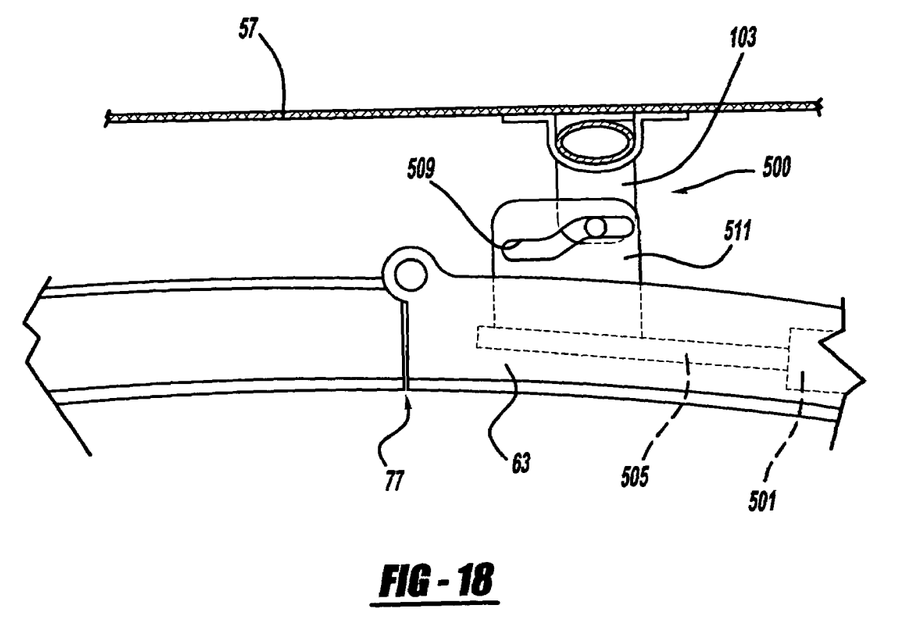
FIG. 18 is a diagrammatic side view showing an alternate embodiment convertible roof apparatus in an advanced-taut condition.

Referring now to FIG. 18, a first alternate embodiment convertible roof system employs a tensioner 500 system having an electromagnetic solenoid 501 coupled to center side rail 63 for operably locking B-joint 77. Solenoid 501 includes coiled wire and a linearly movable plunger acting as or coupled to a bar 505. An outer conductive can or solenoid housing can be employed and a compression spring is located in the aperture within the conductive wire for operably biasing bar 505 in an outwardly extending and tensioning orientation. A slotted camming surface 509 is located internal to a plate 511 affixed to and moveable with bar 505, within an open slot of center side rail 63 (like that shown in FIG. 10). A cam follower pin 513 is attached to number two roof bow 103 and acts to raise and lower roof bow 103 and tension or untension cover 57 in response to bar 505 movement in a generally perpendicular direction to the roof bow. Accordingly, energization of the solenoid wire electromagnetically advances and retracts bar 505 in an actively driven manner. A microprocessor control unit for the convertible roof will automatically cause the solenoid to be appropriately energized or deenergized depending on the sensed position of the convertible roof and/or the vehicle user control signals sent for raising or lowering the convertible roof. It should be appreciated that this solenoid-type and/or internally enclosed camming arrangement can be employed with any of the tensioning systems disclosed herein.

While various embodiments of the convertible roof bow tensioning apparatus have been disclosed herein, it should be appreciated that other aspects of the systems can be employed within the present invention. For example, any of the tensioning configurations disclosed herein can be used for any of the roof bows (for example, the number three and four bows) within the top stack mechanism of a convertible roof. Furthermore, the tensioning systems described herein can be employed for straight folding convertible roofs as well as outfolding ones. It should also be appreciated that biasing devices and/or actuators can be moved to reverse the driven direction of cam movement. Moreover, additional or substitute linkage assembly configurations are useable although some of the advantages of the present invention may not be realized. It should be appreciated that alternate lost motion couplings and camming devices may be provided. Furthermore, the cams and driving bars can be positioned on the front side rail and actuated by manually or automatically driven front header latches, or may be mounted on the rear side rail. Also, the cams and cam followers can be reversed as packaging allows, and a cable may replace bar 651. Alternate joint locking and moveable bar devices that can be also used for tensioning are disclosed in U.S. patent application Ser. No. 10/836,322, entitled "Joint Locking Device for a Convertible Roof System", invented by Arthur MacNee, et al., and filed on the same date as the present application; this application is incorporated by reference herein. While various materials and shapes have been disclosed, it should be appreciated that various other shapes and materials can be employed. It is intended by the following claims to cover these and any other departures from the disclosed embodiments which fall within the true spirit of this invention.

What is claimed is:

1. A convertible roof apparatus comprising:
   side roof rails;
   a set of roof bows coupled to the side rails, the set of roof bow including a forwardmost number one roof bow, a number two roof bow and a number three roof bow;
   a pliable roof cover covering the roof bows when raised; and
   a tensioner operable to move at least one of: (a) the number two roof bow and (b) the number three roof bow, from a retracted position to an extended position in order to increase tautness of the roof cover even after the side rails have been moved from a lowered position to a fully raised position.

2. The convertible roof apparatus of claim 1 wherein the tensioner further comprises a camming surface.

3. The convertible roof apparatus of claim 2 further comprising a cam follower extending from the at least one of the number two roof bow and the number three roof bow, the cam follower operably riding along the camming surface of the tensioner which acts to advance and retract the at least one roof bow relative to the side rails.

4. The convertible roof bow apparatus of claim 2 wherein the camming surface includes an inclining segment and a substantially horizontal segment as viewed in the fully raised position, further comprising a cam follower portion of the number two roof bow moving along the camming surface.

5. The convertible roof apparatus of claim 1 wherein the tensioner further comprises an elongated member slidably coupled to one of the roof rails for movement along a substantially vertical plane aligned with the one of the roof rails, the tensioner also including an inclined ramp simultaneously moving with the elongated member.

6. The convertible roof apparatus of claim 5 wherein the roof rails include a center side rail and the elongated member is at least partially located within the center side rail.

7. The convertible roof apparatus of claim 1 wherein the tensioner is movable in a linear and substantially fore-and-aft direction when acting to advance and retract the at least one roof bow.

8. The convertible roof apparatus of claim 1 wherein the roof rails include a front side rail, a center side rail and a rear side rail, and the tensioner is directly mounted to one of the side roof rails located forward of the rear side rail when in the fully raised position.

9. The convertible roof apparatus of claim 1 wherein the roof rails include a center side rail, and the tensioner is directly mounted to the center side rail and is linearly movable relative to the center side rail.

10. The convertible roof apparatus of claim 1 wherein the at least one selected roof bow is a number two roof bow.

11. The convertible roof apparatus of claim 1 wherein the tensioner further serves to lock a joint associated with the roof rails.

12. The convertible roof apparatus of claim 1 further comprising a linkage assembly coupled to at least one of the roof rails and a lost motion connection coupling the linkage assembly to the tensioner to allow the tensioner to be moved at a different time than the at least one of the roof rails.

13. A convertible roof apparatus comprising:
   a top stack mechanism including side roof rails and roof bows, the top stack mechanism being movable from a closed position to an open position; and
   a camming device operably moving at least one of the roof bows relative to at least one of the roof rails when the remainder of the top stack mechanism is substantially stationary.

14. The convertible roof apparatus of claim 13 wherein the camming device further comprises an elongated member slidably coupled to one of the roof rails.

15. The convertible roof apparatus of claim 14 wherein the elongated member is movable in a linear and substantially fore-and-aft direction when acting to advance and retract the at least one roof bow.

16. The convertible roof apparatus of claim 13 wherein the at least one roof bow is a number two roof bow.

17. The convertible roof apparatus of claim 13 wherein the camming device further serves to lock a joint associated with the roof rails.

18. The convertible roof apparatus of claim 13 further comprising a linkage assembly coupled to at least one of the roof rails and a lost motion connection coupling the linkage assembly to the camming device to allow the camming device to be moved at a different time than the at least one of the roof rails.

19. The convertible roof apparatus of claim 13 further comprising a pliable roof cover coupled to and movable with the top stack mechanism, the camming device operably varying tension of the roof cover substantially independent of opening and closing movement of the top stack mechanism.

20. The convertible roof apparatus of claim 13 wherein the camming device includes an inclining camming surface and a substantially horizontal camming surface as viewed in the closed position, and wherein the roof bows include a number two roof bow having a cam follower portion operably moving along the camming surface.

* * * * *